No. 736,081. PATENTED AUG. 11, 1903.
W. B. FLETCHER.
SHIFTING RAIL FOR VEHICLES.
APPLICATION FILED MAY 21, 1903.
NO MODEL.
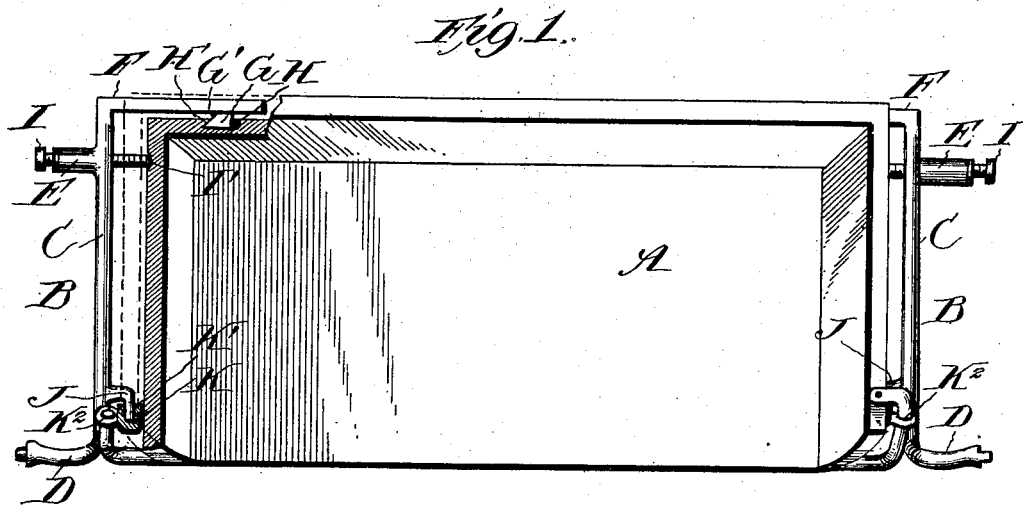
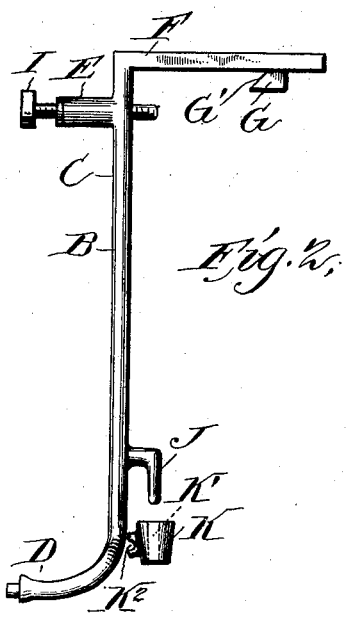
WITNESSES:
G. P. Kingsbury
Harrison B Brown
INVENTOR
William B. Fletcher
BY Munn & Co.
ATTORNEYS.

No. 736,081. Patented August 11, 1903.

UNITED STATES PATENT OFFICE.

WILLIAM B. FLETCHER, OF CAMERON, WEST VIRGINIA.

SHIFTING-RAIL FOR VEHICLES.

SPECIFICATION forming part of Letters Patent No. 736,081, dated August 11, 1903.

Application filed May 21, 1903. Serial No. 158,113. (No model.)

*To all whom it may concern:*

Be it known that I, WILLIAM B. FLETCHER, a citizen of the United States, and a resident of Cameron, in the county of Marshall and State of West Virginia, have made certain new and useful Improvements in Shifting-Rails for Vehicles, of which the following is a specification.

This invention relates to detachable rails for vehicles; and it consists in a certain construction and arrangement of parts whereby the top or canopy of a vehicle may be easily and quickly removed to form an open vehicle and when replaced said parts being firmly secured from rattling, all of which will be fully hereinafter set forth, and the novel features pointed out in the claims.

Reference is had to the accompanying drawings forming a part of this specification, in which—

Figure 1 is a top plan view of a vehicle-seat, part in section, showing my invention in use, and Fig. 2 shows detached detail views of the parts employed.

As indicated in the drawings, A represents a vehicle-seat, and B my improved shifting-rail.

In carrying out my invention I employ a bar C, of any desired cross-section, having an upturned front end D, adapted to support the bows, as usual.

E denotes a hollow internally-screw-threaded projection near the rear end of the bar C, which in addition to serving for attachment of the top brace is made sufficiently long, adapted to provide support for the bows when they are folded, as with the top turned down.

It will be noticed that the extreme rear end F of the bar C is bent extending in rear of the seat and provided on its inner side with a lug G, having its outer side G' inclined, whereby the said lug G is formed wedge-shaped, as shown.

In the rear of the seat, or it may be the vehicle-body, I provide an elongated recess H, having its outer end H' undercut, adapted for locking engagement with the inclined side G' of the lug G.

In the projection E, I arrange a screw I, with its point adapted for engagement with a suitable depression I' in the seat or body, as will be understood.

On the inner side of the bar C, near its upturned end D, I arrange a forwardly-pointing hook J. This hook is designed for engagement with any suitable keeper K, located at the front corner-iron of the seat. It may be formed with a loop K', adapted to receive the hook J, as shown, and an opening $K^2$, in which the seat hand-rail is arranged.

It is understood two shifting-rails are used, one at each end of the seat.

In arranging the rails in place the hook J is placed in the loop K' of the keeper K, and at the same time arranging the lug G in the recess H. Now upon turning the screw I, with its point in the depression I', obviously the inclined side G' of the lug G will be moved to locking engagement with the undercut end H' of the recess H.

Having thus described my invention, what I claim as new, and desire to secure by Letters Patent, is—

1. The combination with a shifting-rail of the character described, a forwardly-pointing hook at the front end thereof, means on the vehicle seat or body adapted, for engagement with the said hook, an inward bend at the rear end of the shifting-rail having a projecting wedge-shaped lug, an elongated recess in the rear side of the vehicle seat or body, having one end undercut, and a screw on the shifting-rail adapted for engagement with a suitable recess in said seat or body, whereby, upon adjustment of the said screw, the said wedge-shaped lug is drawn to locking engagement with the undercut recess, substantially as described.

2. The combination with a shifting-rail of the character described, a rear bent end to the said rail, a wedge-shaped lug on said bent end, a similar, but elongated recess, in the rear side of the vehicle seat or body, a forwardly-pointing hook near the front end of the shifting-rail, a fixed keeper having a suitable loop adapted, for engagement with the said hook, and a hollow projection on the shifting-rail, with internal screw-thread and adapted, to receive a suitable screw, whereby, the said wedge-shaped lug and undercut recess are held to locking engagement, substantially as described.

WILLIAM B. FLETCHER.

Witnesses:
CHAS. W. RIGGS,
JAMES D. PARRIOTT.